June 30, 1936. E. M. WAYLAND 2,045,680
METHOD AND MEANS FOR WASHING FRUIT
Filed Oct. 28, 1930 2 Sheets-Sheet 1
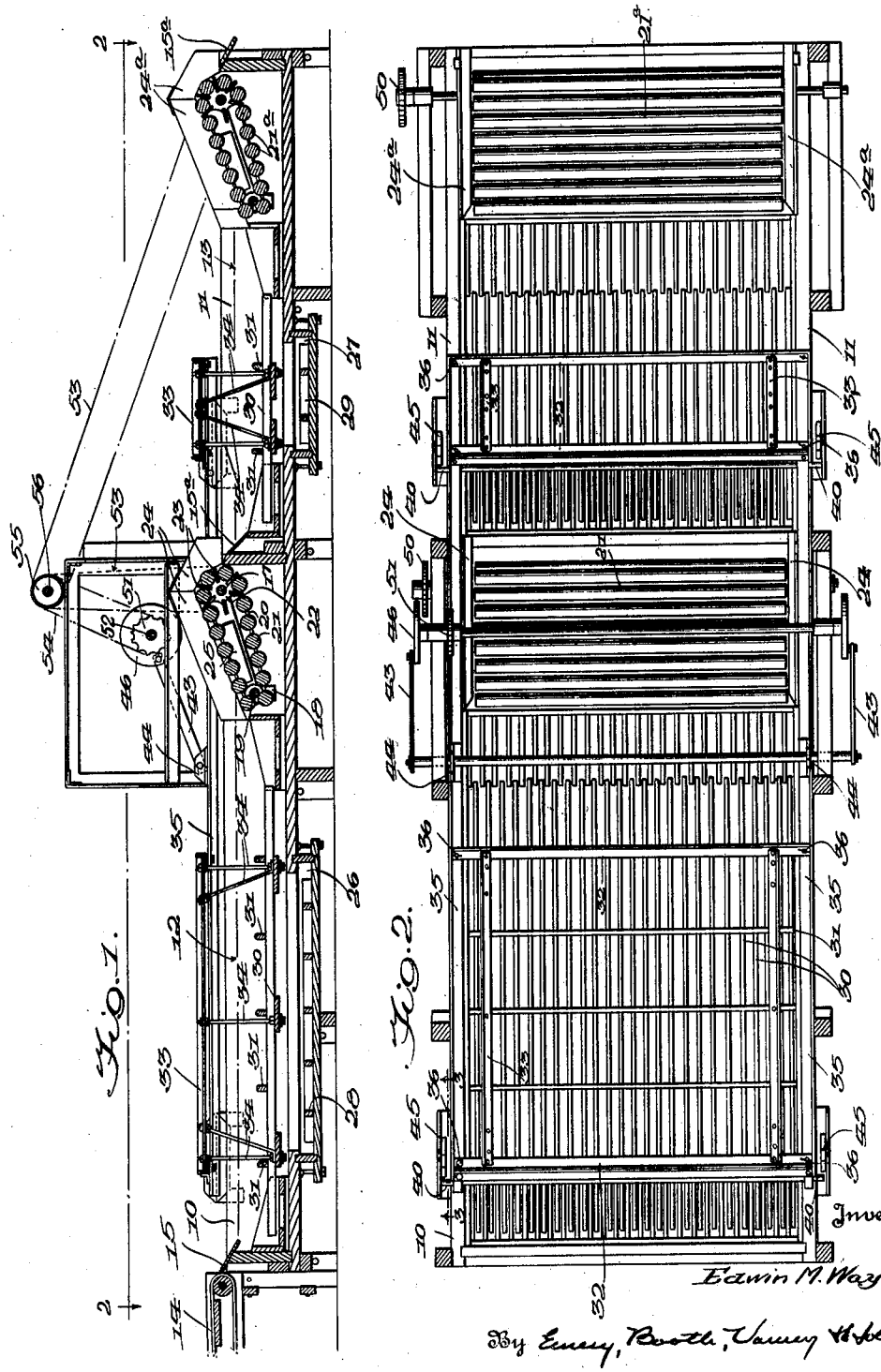

June 30, 1936. E. M. WAYLAND 2,045,680
METHOD AND MEANS FOR WASHING FRUIT
Filed Oct. 28, 1930 2 Sheets-Sheet 2
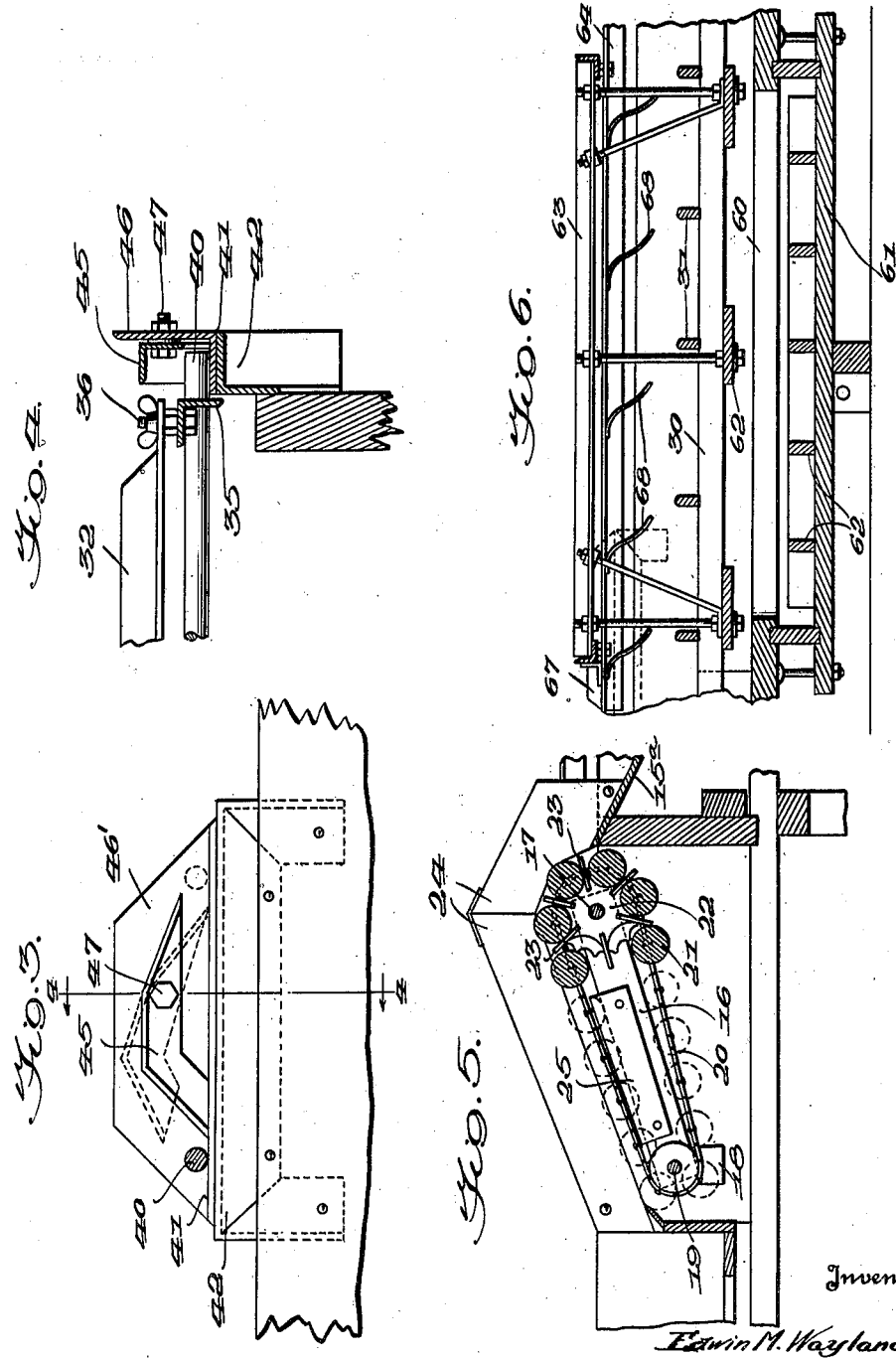
Inventor
Edwin M. Wayland,
By Emery, Booth, Varney & Holcomb
Attorney Patented June 30, 1936

2,045,680

UNITED STATES PATENT OFFICE 2,045,680

METHOD AND MEANS FOR WASHING FRUIT

Edwin M. Wayland, Covesville, Va.

Application October 28, 1930, Serial No. 491,773

8 Claims. (Cl. 146—194)

This invention relates to fruit washing methods and equipment and aims generally to provide an improved method of washing fruit and improved apparatus for carrying out the method.

More detailed objects and advantages of my invention, contributing to the attainment of the primary objects above set forth, are apparent from the following detailed description of the same, and in some instances these contributory objects are of great importance and constitute the main advantage of subsidiary combinations of steps and/or elements, wherefore such objects and advantages constitute further aims of my invention.

The demand of the market for as nearly perfect fruit as can be produced and the natural desire of the grower to produce as large a crop as possible, have led to the almost universal spraying of growing fruit with insect and vegetable parasite controlling solutions leaving a poisonous residue. Probably the solution most widely used for the spraying of apples and other fruits, generally, is a solution comprising arsenate of lead.

As a result of the spraying of fruit with such poisonous solutions it has become necessary at harvest time to thoroughly wash the fruit to remove the poisonous residues and this practice has been made doubly essential by the establishment by the more important countries of the world, of maximum "tolerances" for arsenical residues. For example, Great Britain allows not more than .01 grain of $As_2O_3$ per pound of fruit at the present time.

Arsenical residues are generally removed by washing with dilute hydrochloric acid solution followed by rinsing with a suitable rinsing solution such as clear water or water containing a little lime, and heretofore this treatment has generally been conducted in one of three ways, by subjecting the fruit to the action of a high velocity spray of acid solution followed by the action of a high velocity spray of rinsing solution; by successively dipping the fruit in relatively deep tanks of acid and rinsing solution; and, with fruit which will float in the solutions, by successively floating the fruit in the solution, while striking the fruit from above by slowly moving paddles or the like to submerge, overturn, and advance the fruit.

Each of these methods as heretofore practiced has had certain disadvantages difficult to overcome. Particularly when washing apples likely to have open calyx tubes, such as Jonathan, Gravinstein, Esopus, Spitzenburg, Stayman, Winesap, Ortley, White Pearmain, or Delicious, have these disadvantages been apparent. The deep submersion accompanying the dipping method, and in some instances the submersion occasioned by the paddles heretofore used in the floating process, particularly when the tanks are filled to excessive depth, or when the fruit piles up adjacent the paddles, has caused sufficient hydrostatic pressure to force acid solution through the calyx tubes into the cores of such fruit causing a brownish discoloration and drying of the core tissues, frequently followed by core rot resulting from rot spores carried through the calyx tubes by the solutions. Similarly the high velocity streams of solution directed against the fruit in the spraying process have in some instances caused acid penetration.

Another form of injury which has been encountered, particularly when washing fruit by the floatation process, is so-called "acid injury" due to overexposure of the fruit to the acid bath or incomplete rinsing of the same. This has been so noticeable when washing pears and other fruit having a specific gravity about equal to, or greater than, that of the acid solution that such fruit has to a great extent been washed by the spray or dipping methods; as the washing of such fruit in the floatation equipment above mentioned has been accompanied by a tendency of the heavier specimens to sink to the bottom of the tank and remain exposed to the acid for an undue length of time. Of course if such overexposed fruit could always be culled out the loss would not be great but specimens of this overexposed fruit become entrained in the stream of fruit passing from the washer, and as acid injury does not become apparent until from twenty four to forty eight hours after it occurs, such injured fruit cannot then be detected.

This acid injury may occur on any part of the fruit and results in browned spots which may become depressed and dark with age, so that the packing of even one or two specimens of injured fruit among the perfect fruit is likely to condemn the entire pack in the eyes of a purchaser.

Furthermore, from the standpoint of capacity and expense, the spraying method as heretofore practiced, while considered slightly more rapid than the floating method, has involved the use of much more expensive equipment, and while the dipping method has required the least outlay for equipment, this has been the slowest method of the three.

In view of these facts it has been apparent for a considerable time that a new fruit washing method is needed for thoroughly and uniformly washing the fruit with a reasonable degree of rapidity, capable of being carried out by a relatively simple and inexpensive machine, and it is with these considerations in view that I have developed my present invention.

As above noted my invention comprises not only a new method of washing the fruit, but also a novel apparatus for practicing this method, and as the invention is most readily set forth by describing the method steps in connection with the manner in which these steps are carried out by the use of my novel apparatus, I have adopted such manner of description.

The preferred form of apparatus hereinafter described constitutes a mechanism for performing all the steps of my novel washing method automatically and in such correllated relation as will avoid the difficulties heretofore experienced with floatation washing methods, and I prefer to use such automatic equipment to eliminate, as far as possible, manual operations subject to non-uniformity and carelessness which might result in improper residue removal or injury to the fruit, although it is obvious that various modified devices may be used to carry out my preferred method or modifications thereof without departing from my invention.

My novel method, in its entirety, is applicable to the washing of practically any kind of fruit or vegetables, regardless of the specific gravity thereof, and while the kind of fruit to which it is applied varies the relative importance of its several characteristic features, so far as I have been able to determine, none of its features are disadvantageous with any kind of washable fruit, although various steps of the method may be altered or omitted where conditions do not require a washing method of general application.

In the accompanying drawings forming a part of this specification:

Fig. 1 is a longitudinal sectional view of a preferred form of apparatus for carrying out my novel method;

Fig. 2 is a sectional plan view thereof taken at line 2—2 of Fig. 1 with certain parts omitted for clearness;

Fig. 3 is a detail view taken at line 3—3 of Fig. 2, looking in the direction indicated by the arrows, drawn to a larger scale;

Fig. 4 is a sectional detail view taken at line 4—4 of Fig. 3, looking in the direction indicated by the arrows and drawn to the same scale as Fig. 3;

Fig. 5 is an enlarged sectional view of my novel transfer mechanism; and

Fig. 6 is an enlarged sectional view of a washing tank and similar to those shown in Figs. 1 and 2, showing the application thereto of wiping members for assisting the washing action.

Referring to the drawings the illustrative apparatus disclosed in Figs. 1 and 2 comprises a tank 10 for containing acid solution and a tank 11 for containing rinsing liquid, constituting a plurality of successive washing and rinsing tanks.

Each of the successive tanks 10, 11 is filled to a suitable depth, indicated generally at 12 and 13, with the bath intended to be contained therein. For the removal of arsenical residues from apples the tank 10 will customarily be filled to the depth 12 with a dilute solution of hydrochloric acid in water, and the tank 11 will customarily be filled to the depth 13 with clear water or water with a little lime added thereto.

Any suitable manual or mechanical means may be employed to conduct fruit to be washed to the receiving end of the first tank 10, and I have indicated at 14 and 15 respectively (see Fig. 1, omitted in Fig. 2) an ordinary dump belt or canvas belt conveyor, and an ordinary rubber lined chute leading from the same into the receiving end of the tank 10, as illustrative of such means.

Any suitable means may be employed to transfer fruit from the discharge end of the first tank 10 to the receiving end of the second tank 11, but I prefer to use a specially constructed conveying means to positively pick up and transfer the fruit uniformly, prevent the piling up at either end, and permit the solution to drain therefrom. Preferably the conveyor is arranged to be lifted from the tank when necessary to make repairs or clean it, the side spacer bars 16 which support the moving parts being pivoted at the upper end on the head shaft 17 and supported at the lower end on blocks 18 (see Fig. 5).

At the lower end of the conveyor is a submerged idler shaft 19 provided at either end with idler disks over which run sprocket chains 20 carrying the rollers 21. The elevated driving shaft or head shaft 17 is provided near its ends with driving sprockets for the chains, and intermediate its ends with driving spiders 22 fixed thereto and carrying radially disposed ejector boards 23 in position to extend through the spaces between the rollers. The rollers 21 are journaled at their ends on spindles on the links of the side chains 20, so as to be free to rotate or not. To enable ready driving without binding the conveyor is mounted so that the rollers 21 ride upon the spiders 22, between the ejector boards 23, while the chains ride upon the idler disks and sprockets to prevent binding of the rollers against the shafts and side guides 24. As is clearly shown in Fig. 5, in the upper flight of the conveyor the chains 20 are supported on runners or blocks 25 secured to the side spacer bars 16, but the free rollers merely hang upon their end supports and are not positively revolved. The side guides 24 are removably bolted or otherwise secured to the tank sides, and may be readily unfastened and lifted out so as to permit the assembled conveyor to be swung up out of the bath by raising the idler shaft end. These side guides fill the space above the chain between the ends of the rollers and the tank side and prevent the fruit from jamming or being bruised by the chains or ends of the rollers. This construction also permits minor repairs on the conveyor chains and rollers to be readily made, and also affords ready access to the space beneath the conveyor for cleaning and inspection.

Another characteristic novel feature of this preferred form of transfer means is the use of spaced free rollers to obtain a small area of contact with the fruit and unrestricted draining thereof, and these non-rotating rollers in the conveying flight also enable the fruit to be elevated at a sharper incline than would be possible if the rollers were rotated, thus reducing the space required for the equipment, a very important consideration because of the congestion usually encountered in a packing house, particularly near the receiving platform and washing equipment. The ejector boards 23 prevent small fruit and refuse from becoming entangled in the conveyor, and in combination with the chute 15a provide a gentle but positive means for moving the fruit away from the delivery end.

If more than two baths are to be used it is of course understood that suitable transferring means, such as that described, may be employed between all successive baths, and as indicated in Fig. 1, I prefer to employ the same sort of transferring means for removing the fruit from the last tank of the series and delivering it for further steps, such as drying or sorting, incident to the process of packing; but it is obvious that manual or any other suitable means may be employed for removing the fruit from the last tank if the advantages of the particular means described are not desired or required.

Rubber covered chutes 15a, similar to the chute 15, are preferably used to conduct the fruit from the delivery end of each transferring means to the receiving end of the succeeding tank or other equipment, to gently lower the fruit thereto. When delivering to the successive tanks these chutes impart to the fruit an initial forward movement sufficient to carry it ahead so that successive specimens of fruit will not be dropped one upon the other.

As is clearly indicated at 26 and 27, it is preferable to provide a deep end portion throughout at least a part of the bottom of each tank to receive leaves, twigs and other refuse which may be fed to the washer along with the fruit, and I prefer to insert in these catch-basin portions 26 and 27, suitable baffle-board units 28 and 29 to obstruct agitating currents and prevent undue stirring up of the collected refuse. These units 28 and 29 are preferably removable to facilitate cleaning out of the catch basins 26 and 27, and may conveniently comprise side walls and transverse partitions, or a grid-work of longitudinal and transverse partitions.

Of course the catch-basin may be coextensive with the bottom of the tank and actually constitute merely a deepening thereof, but as I consider the main body of liquid only that to which turbulence is imparted as hereinafter described, the distinction between turbulent and relatively non-turbulent zones will serve to differentiate the main body of the bath from the catch-basin zone.

The structure so far described comprises tanks for the several baths, means for conducting fruit to the first of said tanks, means for transferring fruit from one tank to the next, means for removing fruit from the last tank, and means at the bottom of each tank for entrapping refuse which may be fed thereto.

The structure hereinafter described is that which I prefer to use to effect the washing, tumbling, floatation maintaining, advancing and general handling of the fruit while in the several baths, to carry out these features of my novel washing method, to which features I attribute largely its success and universality of application.

As above noted, the main disadvantages of the floatation washing methods now in general use result from bruising of fruit by the paddles used to submerge the same, from over-submersion of the fruit, due to the action of such submersion devices and to piling up of fruit in advance thereof, and non-uniformity of advance of the fruit through the acid solution due to lack of positive control of its advance when the equipment is loaded to capacity or when heavy fruit, such as pears, is being washed. I have conceived that these difficulties can be largely eliminated only by doing away with any overhead paddles or similar devices intended to advance and overturn the fruit which may drive the fruit downwardly into the solution, and I have found that the fruit can be satisfactorily handled by an entirely different method, operating from below.

I have developed the method of operating upon the fruit from below, largely through the medium of the solution, to maintain it in the upper strata or surface of the solution regardless of its specific gravity so that it will not be subjected to excessive hydrostatic pressure, and so that it will be maintained in a position to be positively advanced through the solution. According to this novel method I preferably employ nothing but violent turbulence of the solution as a means for tumbling the fruit in these surface strata, and create this turbulence mainly in the form of a vertical heaving of the solution while providing for the positive advance of the fruit by the creation of a generally longitudinal trend of turbulence in the strata of liquid carrying the fruit, assisted, under certain conditions, by a gentle mechanical lifting and advancing action at the same time.

My novel apparatus for carrying out this method, as exemplified by the illustrative structure shown in the drawings, comprises a discontinuous agitating means applied to each tank, shown as a plurality of longitudinal and transverse slats 30 and 31 fastened together in any suitable way, and of which the longitudinal slats are shorter than the available length of the tank not occupied by the transferring means 21 or 21a, to enable the agitating structure to be moved back and forth longitudinally of the tank.

Each discontinuous agitator structure is preferably carried by a mounting frame composed of transverse attaching bars 32 and longitudinal mounting bars 33, fastened together to form a frame as shown. The agitator structure is preferably trussed to the longitudinal mounting bars 33 as shown, the trussing rods 34 being preferably protected by rubber sleeves and/or acid resistant paint, at least for those units intended for use in the acid bath; and, as is best shown in Figs. 2 and 4, the transverse mounting bars 32 are removably mounted on a main agitator driving frame 35 by suitable means such as the wing nuts 36, to facilitate removal of the mounting frames 32—33 and discontinuous agitators 30—31 to enable cleaning of the tanks 10 and 11 and the catch-basins 26 and 27.

According to the illustrative embodiment of my method, it is desirable that the agitator be gently raised to a position just below the surface strata of the liquid in which the fruit floats; then moved longitudinally of the tank in this position in the immediate subsurface of the liquid in the direction of feed of fruit therethrough; then moved downwardly at a comparatively rapid rate; and then moved counter-longitudinally to its initial position at the remote subsurface of the main body of liquid in the tank.

The effect of raising the discontinuous member 30—31 is to produce considerable vertical turbulence or heaving of the entire subsurface of the liquid in the tank, which is of course transmitted to the surface strata thereof, and at the speeds at which it is practical to raise this member there can be no injury to the fruit, even though it be fruit of a high specific gravity, as pears, which may have sunk sufficiently into the liquid to be contacted by the discontinuous member and to be elevated thereby.

The longitudinal movement of the discontinuous member in the immediate subsurface of the liquid causes a longitudinal trend of turbulence in this area which is of course transmitted to the surface. This longitudinal trend of turbulence is the main factor contributing to the movement of the fruit across the tank, particularly where the liquid level is maintained quite high above the discontinuous member and fruit of low specific gravity is being washed. If the liquid level be low, or if the fruit have a high specific gravity, the transverse slats 31, which have been gently brought into contact with the fruit, impart a degree of forward motion directly to the same, while the turbulent back-flow of liquid past these members 31 imparts a tumbling motion to the fruit; but in either case it is the longitudinal trend of turbulence which maintains the forward motion of the fruit during the downward, rearward, and upward movement of the discontinuous member.

The downward movement of the discontinuous member is preferably initiated quite suddenly and accomplished as rapidly as possible, as this movement is away from the fruit and can in no way injure the same, while the more sudden and rapid the movement, the greater the vertical turbulence or heaving produced. In addition it seems that even if this movement be made quite sudden, there is but little tendency of the fruit to follow downwardly after the receding member.

The rearward movement of the discontinuous member in the remote subsurface of the main body of the bath aids the longitudinal circulatory motion imparted to the liquid by the counter longitudinal movement at the immediate subsurface and effects a return of the discontinuous member to a position to repeat the cycle. Of course, if the tank be provided with a catch-basin 26 or 27 of only a limited length, this longitudinal movement aids the sweeping of refuse thereto, to be trapped in the relatively quiet zone maintained by the baffle members 28 or 29.

Any suitable means may be used to impart the desired motion to the discontinuous agitators 30—31, and while I prefer to employ the simple and effective means disclosed, my invention is not limited thereto. The means disclosed comprises pintle-members 40 projecting from the driving frame 35, supported on slides or rails 41 (see Figs. 3 & 4), suitably mounted adjacent the sides of the tanks 10 and 11, as by the brackets 42. Longitudinal reciprocation is imparted to the frame 35 by one or more links 43, pivoted to ears 44, carried by the frame 35, which are connected to eccentric or crank members 46 to be driven thereby. Upward and downward movements of the agitators 30—31, between the rearward and forward movement thereof, respectively, are accomplished, in the embodiment disclosed, by cam members or dogs 45, pivoted to lugs 46' adjacent the rails 41, as indicated at 47, to normally assume the position shown in Fig. 3.

It will be apparent from reference to Fig. 1, that with the parts in the position shown therein, the initiation of clockwise rotation of the eccentric means 46 will draw the frame 35 forwardly. Referring to Fig. 3, it will be seen that as the pintles 40 are moved forwardly they strike the cam members 45, and ride upwardly upon the same, lifting the frame 35 and agitators 30—31 to impart vertical turbulence to the solutions in the tanks. The cam members 45, as shown, are provided with level top surfaces of any suitable longitudinal extent, which provide for forward longitudinal movement of the agitators 30—31 in the immediate subsurfaces of the baths. After the pintles 40 have passed beyond the pivot members 47 the dogs 45 are tilted downwardly to the position indicated in dotted lines in Fig. 3, and the weight of the driving frame 35 and the parts associated therewith causes the agitators 30—31 to sink until the pintles 40 rest upon the slideways 41. The agitators 30—31 are customarily constructed of wood, and the natural buoyancy of this material cushions the fall of the parts and avoids undue noisiness of operation. Of course, in installations which tend to be noisy, other means, such as rubber cushions, shock-absorbing springs, or dashpots, can be used to further cushion the descent of the driving frame 35 and agitators 30—31, without departing from my invention.

After the descent of the pintles 40 to the slide rails 41 the cam-members 45 return by gravity to their initial positions shown in solid lines in Fig. 3, and continued rotation of the eccentric means 46 slides the frame 35 rearwardly, carrying the pins 40 under the dogs 45, which tilt upwardly allowing the pins 40 to pass to their initial positions, and drop downwardly after passage of the pins, into position to elevate the pins upon their next forward motion, to repeat the cycle.

In the equipment described, the parts which must be driven are the several transfer-means and the eccentric 46, and as these parts may be driven at the requisite rates of speed in any suitable manner without departing from my invention, I have indicated in Figs. 1 and 2 an illustrative driving means comprising sprockets 50 mounted on the drive shafts of the several transfer devices and a sprocket 51 mounted on the shaft 52 which carries the eccentrics 46, respectively connected by chains 53 and 54, to suitable sprockets 55, carried by a main drive shaft 56, suitably journaled upon, or adjacent to, the machine, to constitute a chain drive for these several parts.

The application of my novel washing method is clearly indicated by the description above, as is the operation of the equipment above described as illustrative of the apparatus phase of my invention. The method and apparatus as set forth provides for the thorough and uniform washing without injury of even the tenderest fruits, regardless of the specific gravity of the fruit being treated, and the positive control of the time of exposure of the fruit to each of the several solutions, enables the fruit to be uniformly exposed for a period sufficient to thoroughly clean even dirtier fruit than is ordinarily encountered.

It is clear from the above description of one manner of practicing my new method and one arrangement of equipment for carrying out the same, that both the method and apparatus phases of my invention may be extensively modified without departing from the spirit of the invention, and in Fig. 6 I have indicated a modification of my invention to provide for wiping of the fruit being washed, which I deem to be desirable where the fruit is rough skinned, extremely dirty, or coated with a film difficult to dissolve, whether this be a natural wax film or a film of spray or other residue.

Expert packers have recommended that fruit be washed as soon after picking as possible, when it is in its firmest condition, to minimize the likelihood of bruising and avoid the complication to washing caused with some fruits, such as apples, by this development of wax on the fruit.

However, it is not always possible to wash fruit promptly, and warming of the acid solution, as has been heretofore practiced by those faced with the problem of washing waxy fruit, is not uniformly successful.

However, this modification of my method and apparatus so that the fruit may be gently rubbed or frictionally washed with an absorbent member wet with the washing solution, materially assists in the removal of such waxy coatings or other deposits difficult to dissolve.

This particular modification of my method comprises gently cloth-washing, sponging, or wet-rubbing the fruit, preferably in a direction other than its direction of movement through the body of washing solution, while it is supported therein. The preferred direction of this action, aided by the turbulence maintained, causes a rolling of the fruit in the solution to present all of its sides to be frictionally washed and enables even waxy fruit to be satisfactorily washed.

In Fig. 6 I have indicated a washing unit comprising a tank 60 provided with a catch-basin 61 and an agitator 62 carried by a mounting frame 63, all similar to corresponding parts of the equipment shown in Figs. 1 and 2. Suitable means, which may be similar to that shown in Figs. 1 and 2, and comprise the driving frame 64, reciprocating means, and raising and lowering means 67, is provided to impart to the agitating means the longitudinal and vertical motion above described. It is apparent that in moving the agitator 62 under the solution the mounting frame and driving frame move through a similar path, which approaches the level of the floating fruit when traveling rearwardly, rather than when traveling forwardly. Accordingly, to provide wet-rubbing means for engaging the fruit with a motion counter to the direction of the movement of fruit, it is merely necessary to suspend such means from one or the other of these frames in position to lightly bear upon the fruit when the frame is in its lowermost position.

The wet-rubbing means disclosed in Fig. 6 comprises a plurality of transverse hanging fabric strips 68, substantially as wide as the tank, and of sufficient length to trail into the liquid bath if not occupied by fruit. As shown, I prefer to attach these strips in a trailing position to the mounting frame 63, to be removable therewith, and the attachment may be effected in any suitable way, as by downwardly extending laterally positioned arms or by longitudinal direct attachment of the upper edge of the strip to bars carried by the mounting frame 63.

With this arrangement the wet-rubbing strips will be lifted clear of the fruit during forward movement of the driving frame 64 and will be trailed across the fruit during rearward movement of this frame to effect the desired mechanical wet-frictioning of the surface of the fruit. For simplicity I prefer to mount these wet-rubbing strips upon the mounting frame 63 as shown, but obviously other arrangements or special means for effecting a sponging of the floating fruit may be employed without departing from my invention.

I have described preferred modes of practicing my novel method, and preferred embodiments of novel equipment for carrying out the same, for the purpose of clearly illustrating and explaining my invention. However, my invention is not limited to the specific details set forth for illustrative purposes, but comprises all methods and equipment falling within the intent and spirit of the following claims, broadly construed:

I claim:

1. The method of washing fruit by floatation to avoid injury thereto which comprises maintaining a body of liquid relatively deep with respect to the floating depth of the fruit to be washed, sequentially producing in the liquid vertical turbulence substantially throughout its subsurface, longitudinal turbulence substantially restricted to its immediate subsurface, counter-vertical turbulence substantially throughout its subsurface, and counter-longitudinal turbulence substantially restricted to its remote subsurface, to produce turbulence of the surface of the liquid and motion thereof from one end of the body of liquid toward the other, floating fruit across said body of liquid to be tumbled about therein and thereby and avoiding deep submersion thereof likely to cause injury by entry of liquid through the calyx tubes of the fruit, and continuously removing fruit from the end of the body toward which it is moved and adding fruit at the other end of the body.

2. The method of washing fruit by floatation to avoid injury thereto which comprises maintaining a body of liquid relatively deep with respect to the floating depth of the fruit to be washed, sequentially producing in the liquid vertical turbulence substantially throughout its subsurface, longitudinal turbulence substantially restricted to its immediate subsurface, counter-vertical turbulence substantially throughout its subsurface, and counter-longitudinal turbulence substantially restricted to its remote subsurface, to produce turbulence of the surface of the liquid and motion thereof from one end of the body of liquid toward the other, floating fruit across said body of liquid to be tumbled about therein and thereby, wet-rubbing the surfaces of said fruit upwardly presented during its tumbling movement across the surface of said body of liquid, and continuously removing fruit from the end of the body toward which it is moved and adding fruit at the other end of the body.

3. The method of washing fruit by floatation to avoid injury thereto which comprises maintaining a body of liquid relatively deep with respect to the floating depth of the fruit to be washed, sequentially producing in the liquid vertical turbulence substantially throughout its subsurface, longitudinal turbulence substantially restricted to its immediate subsurface, counter-vertical turbulence substantially throughout its subsurface, and counter-longitudinal turbulence substantially restricted to its remote subsurface, to produce turbulence of the surface of the liquid and motion thereof from one end of the body of liquid toward the other, floating fruit across said body of liquid to be tumbled about therein and thereby, intermittently wet-rubbing the fruit in a direction other than its direction of movement across said body of liquid, and continuously removing fruit from the end of the body toward which it is moved and adding fruit at the other end of the body.

4. Floatation fruit washing apparatus comprising successive tanks for containing washing and rinsing baths, means for delivering fruit to one end of the first tank, means at the other end of the first tank for transferring fruit to the second tank, and means of less length than said first tank comprising a plurality of bars movable vertically and longitudinally in a closed path entirely below the liquid level therein for violently agitating the liquid in said tank and imparting to the fruit a trend of movement toward the means for transferring it to the next tank.

5. Fruit washing equipment comprising a tank, a conveyor comprising side bars and continuous side chains carried thereby, spaced free rollers carried by said chains, a driving shaft journaled adjacent one end of said tank for supporting and driving said chains at their upper ends, spiders carried by said driving shaft for supporting said rollers, ejector boards carried by said spiders to project between said rollers, a second shaft carried by said side bars and normally positioned within said tank for supporting said chains at their lower ends, and means carried by said spacer bars for supporting the upper run of said chains to maintain the upper run of said conveyor flat without rotating the rollers, said side bars being freely movable at their lower ends to permit raising said conveyor from the tank, substantially as and for the purposes described.

6. Fruit washing equipment comprising a tank, slideways adjacent said tank, a frame movable on said slideways, a crank and link for reciprocating said frame along said slideways, pivoted dogs adjacent said slideways for elevating and dropping said frame during its movement in one direction, said dogs being disengaged and hence inoperative to raise and lower said frame during its movement in the opposite direction, a discontinuous member within said tank connected to said frame to be moved thereby, and a trailing wet-rubbing member carried by said frame to be trailed across the contents of said tank, substantially as and for the purposes described.

7. In a fruit washing system of the type having a bath containing tank, means for conducting fruit to the receiving end of said tank, and means for removing fruit from the discharge end of said tank, the combination of slide rails mounted adjacent said tank, a driving frame slidably supported by said slide rails, means for moving said driving frame counter to the conveying direction of said transferring means and then raising said frame and moving it in raised position in the opposite direction and then lowering it to its initial position, submerged discontinuous agitating means carried by said frame and movable thereby in a zone below the liquid surface, and wet-rubbing strips carried by said frame to be moved across the liquid surface during the first mentioned movement of said frame.

8. In a fruit washing system of the type comprising a bath containing tank, means for transferring fruit from the tank comprising a shaft submerged in said tank and carrying idler disks, an elevated driving shaft carrying spiders supporting ejector boards, and a conveyor comprising side chains carrying free rollers, said chains being trained over said idler disks and said rollers being trained on said spiders between said ejector boards to provide for movement of said conveyor without rotation of said rollers; said submerged shaft being rotatably mounted in side bars pivoted at the driving shaft end to permit said submerged shaft to be lifted from the bath.

EDWIN M. WAYLAND.